United States Patent [19]

Stumpe et al.

[11] Patent Number: 5,441,335
[45] Date of Patent: Aug. 15, 1995

[54] AUXILIARY AND FRICTION BRAKING SYSTEM WHICH RECOGNIZES RAPID BRAKING

[75] Inventors: Werner Stumpe; Jürgen Wrede, both of Stuttgart, Germany

[73] Assignee: Robert Bosch GmbH, Stuttgart, Germany

[21] Appl. No.: 256,241

[22] PCT Filed: Feb. 23, 1993

[86] PCT No.: PCT/DE93/00156
§ 371 Date: Jul. 1, 1994
§ 102(e) Date: Jul. 1, 1994

[87] PCT Pub. No.: WO93/17898
PCT Pub. Date: Sep. 16, 1993

[30] Foreign Application Priority Data

Mar. 12, 1992 [DE] Germany .................. 42 07 965.9

[51] Int. Cl.⁶ .................. B60T 8/00; B60T 10/00; B60T 13/58; B60T 13/66
[52] U.S. Cl. .................. 303/3; 188/156; 303/160; 303/113.4; 303/20
[58] Field of Search .................. 303/3, 100, 20, 9.61, 303/13–18, 113.4, DIG 3, DIG 4, 102, 103; 188/156, 159, 106 P

[56] References Cited

U.S. PATENT DOCUMENTS

| | | | |
|---|---|---|---|
| 4,962,969 | 10/1990 | Davis | 303/3 |
| 5,184,875 | 2/1993 | Wrede | 303/3 |
| 5,378,053 | 1/1995 | Patient et al. | 303/3 |

*Primary Examiner*—Douglas C. Butler
*Attorney, Agent, or Firm*—Felfe & Lynch

[57] ABSTRACT

Braking system determines a brake actuation rate $\Delta U/\Delta t$, where U is a function of pedal position S, and compares the rate to a limiting value G. When G is not exceeded, the auxiliary brake is actuated first and the friction brake is actuated with a small slope. When G is exceeded, the friction brake is actuated sooner and with a greater slope, and the auxiliary brake may not be actuated at all.

5 Claims, 2 Drawing Sheets

AUXILIARY AND FRICTION BRAKING SYSTEM WHICH RECOGNIZES RAPID BRAKING

PRIOR ART

Vehicle brakes including an acutable wear-free auxiliary brake are known. The engine brake, retarder or constant throttles, for example, can be considered an auxiliary brake.

An electronically controlled motor vehicle brake (ELB), for utility vehicles for example, has an electrical braking value pick-up which emits an electrical output signal (for example, a potentiometer voltage) depending on the actuation path of the brake pedal to an electronic control unit. A required value $U_R$ (for example pressure) for the control of the friction brakes and a required value $U_D$ for the control of the auxiliary brakes (for example engine brake, constant throttle, electrical or hydrodynamic retarder) are in turn derived from this electrical output signal U. FIG. 1 shows the characteristic.

In order to preserve the friction brakes as much as possible and to keep the wear low, only the auxiliary brakes are now activated in the initial region $s_{01}$ of the actuation path $(U_D)$. It is only when their braking effect is not sufficient that the friction brakes are added. The characteristic of the friction brakes $U_R$ is also still relatively flat at the beginning in order to achieve good graduation.

In the case of rapid braking or emergency braking, however, this arrangement has the disadvantage that the friction brake only comes into use relatively late (after $s_{01}$).

Because of this, longer response times and pressure build-up times occur with the consequence of a longer braking distance.

The auxiliary brakes react so sluggishly that they only become effective too late in the case of emergency braking. Furthermore, their braking effect is limited; it is, furthermore, dependent on speed and rotational speed and it does not remain effective until the vehicle is at rest.

SUMMARY OF THE INVENTION

The following advantages are provided by the invention.

The required value characteristic for the activation of the friction brakes depends on the actuation rate $$\frac{\Delta U}{\Delta t}$$

at the braking value pick-up.

In the case of slower actuation rate (less than a limiting value G), a late and slow activation of the friction brake is effected because the auxiliary brake comes into use first (no wear!).

In the case of rapid actuation rate (greater than G), rapid response of the friction brakes is effected and the auxiliary brakes may even be switched off.

There is a short braking distance with integrated activation of the friction brake and auxiliary brake with an electrical braking value pick-up.

DETAILED DESCRIPTION OF THE PREFERRED EMBODIMENT

Figure 1:
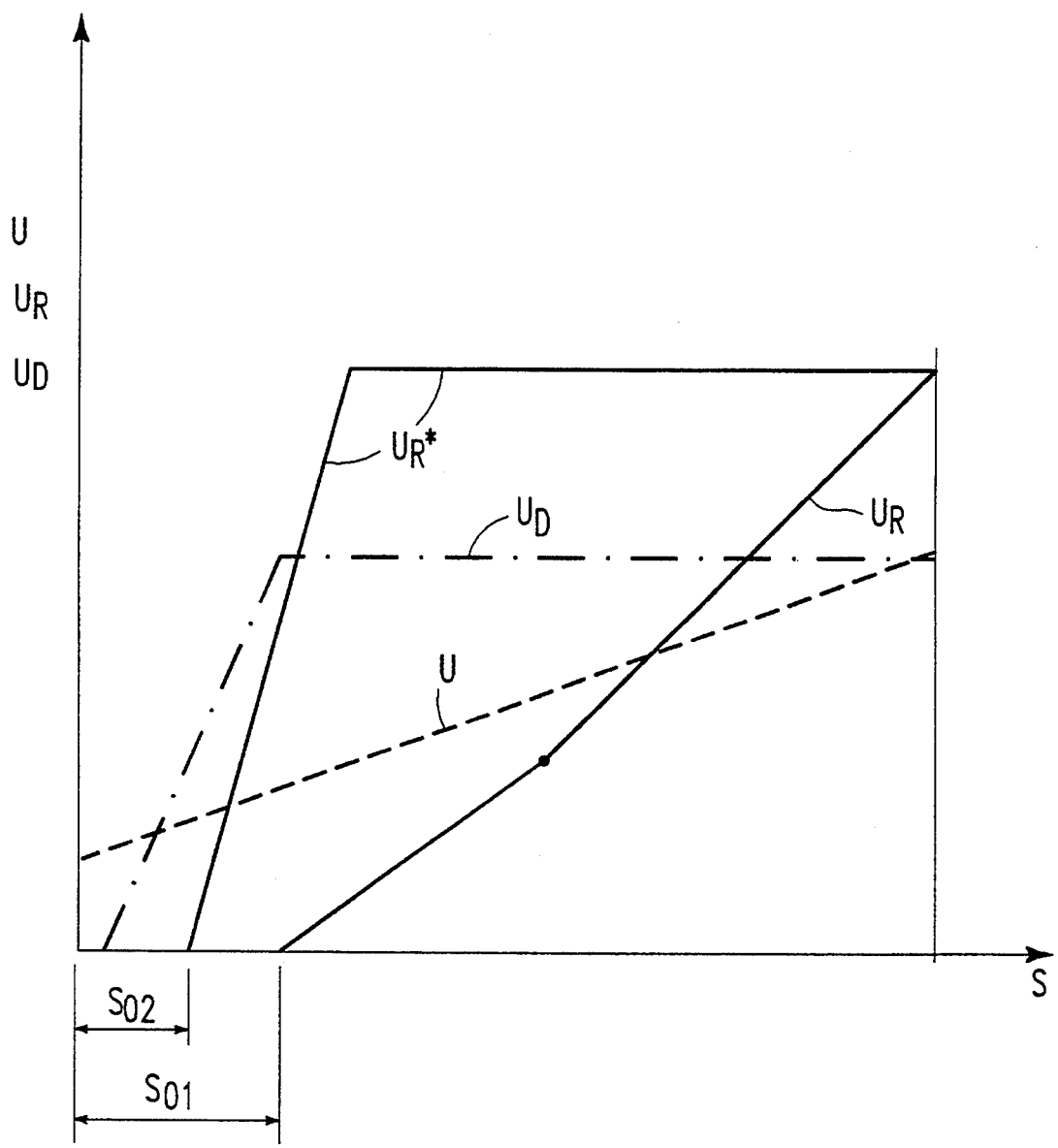
FIG. 1 plots various output signals versus actuation path
Figure 2:
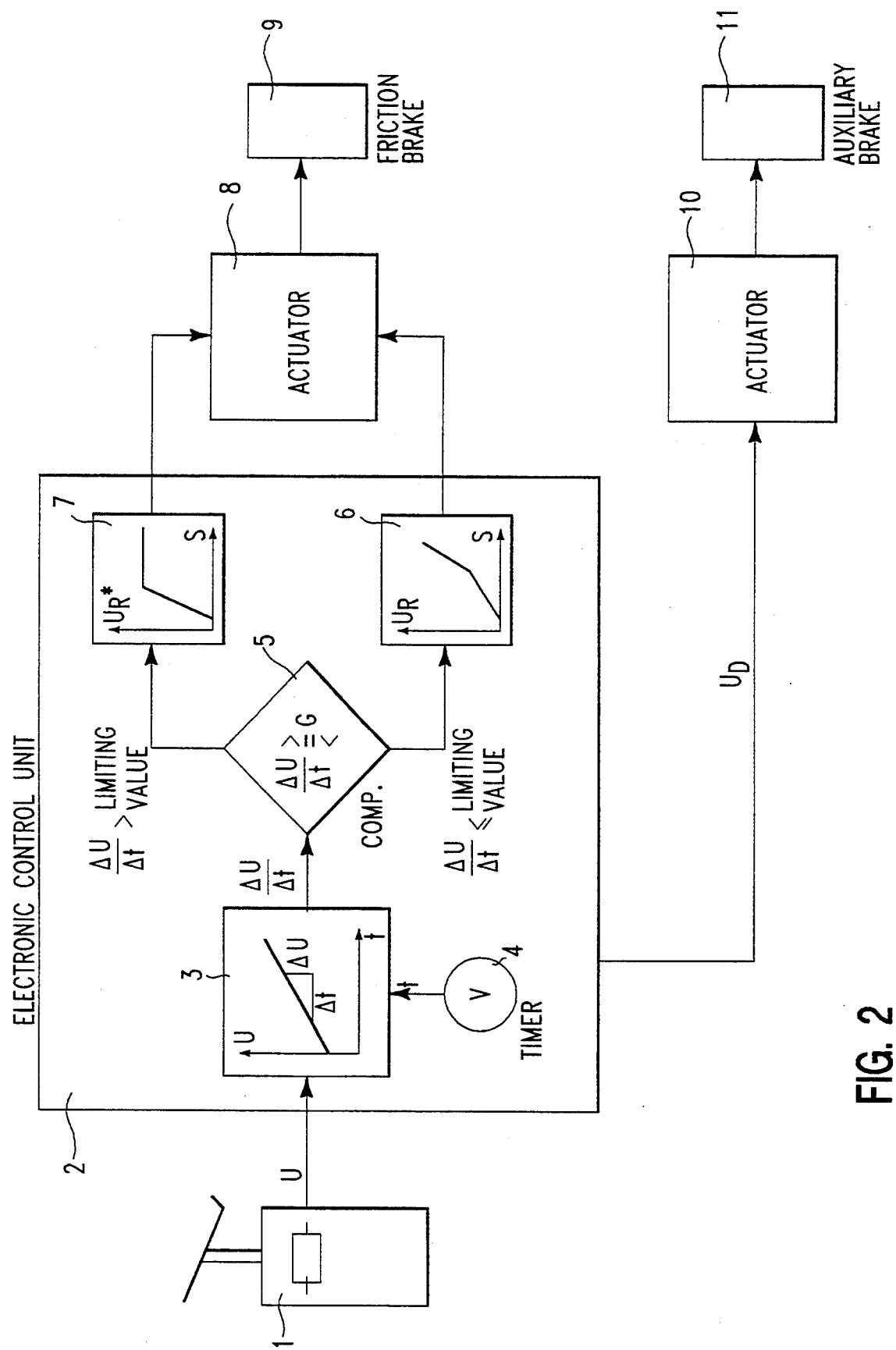
FIG. 2 shows a block circuit diagram of a vehicle brake according to the invention.

An electronically controlled motor vehicle brake (ELB) is represented in a block circuit diagram in FIG. 2. An electrical braking value pick-up 1 generates an electrical output signal U (a potentiometer voltage, for example) as a function of the actuation path s, of the brake pedal and is connected to an electronic control unit 2. A required value $U_R$ for the control of the friction brakes and a required value $U_D$ for controlling the auxiliary brakes (engine brake, constant throttle, electrical or hydrodynamic retarder, for example) corresponding to the characteristics of FIG. 1 is in turn generated from this electrical output signal U.

In order to preserve the friction brakes as much as possible and to keep the wear low, only the sustained-action brakes 11 (via an actuator 10) are now activated in the initial range $s_{01}$ of the actuation path $(U_D)$. It is only when its braking effect is no longer sufficient that the friction brakes 9 are added $(U_R)$. The characteristic of the friction brakes $U_R$ is also still relatively flat at the beginning in order to achieve good graduation (block 6).

As already mentioned above, however, this arrangement alone has the disadvantage that the friction brake only comes into use relatively late (after $s_{01}$) in the case of rapid braking or emergency braking.

Because of this, longer response times and pressure build-up times occur and the consequence of this is a longer braking distance.

In this arrangement, the auxiliary brakes react so sluggishly that they only become effective too late in the case of emergency braking. Their braking effect is, furthermore, limited; it depends on speed and rotational speed and it does not continue until the vehicle is at rest.

In order to resolve this conflict of objectives between slow actuation for speed matching and rapid actuation for emergency braking, the following procedure is adopted:

The gradient $\Delta U/\Delta t$, which presents a measure of the actuation rate of the braking value pick-up 1, is formed in the control unit 2, in a block 3, from the variation with time (timer 4) of U.

If this gradient $\Delta U/\Delta t$ is below or equal to a limiting value G, "slow braking" is present. The decision is made by a comparator 5. This means that the friction brake 9 is controlled by means of an actuator 8 (a pressure control valve, for example) in accordance with the usual characteristic $U_R$ of the block 6 and therefore only responds relatively late. The auxiliary brake 11 which is activated by means of the actuator 10 acts first in this case.

If the gradient $\Delta U/\Delta t$ is above the limiting value G, the block 5 recognizes rapid braking. In this case, the friction brake is controlled in accordance with the changed characteristic $U_R^*$ of a block 7; it responds earlier ($s_{02}$) and rises more steeply (see also FIG. 1): the braking distance is shortened.

In the case of rapid braking, the actuation of the auxiliary brakes 11 can be retained by means of an actuator 10 (characteristic UD). As an alternative to this, the auxiliary brake 11 can also be switched off in this case in order, for example, to prevent unwanted locking of the wheels during emergency braking.

Because rapid braking occurs relatively seldom, the use of the friction brake has, in this case, no effect on the wear.

We claim:

1. Braking system for a motor vehicle of the type having a brake pedal, friction brakes at the wheels, and an auxiliary brake, said system comprising means for determining the actuation path S of the brake pedal, means for generating an actuation value U which depends on the actuation path S, means for determining an actuation rate $\Delta U/\Delta t$ from said value U and time t, means for comparing $\Delta U/\Delta t$ to a limiting value G, means for actuating said auxiliary brake prior to a first value $S_{01}$ of the actuation path S when the rate $\Delta U/\Delta t$ is less than or equal to G, and for actuating said friction brake with a slope $U_R/S$ when S reaches $S_{01}$ and the rate $\Delta U/\Delta t$ is less than or equal to G, and means for actuating said friction brake with a slope $U_R^*/S$ when S reaches a second value $S_{02}$ and the rate $\Delta U/\Delta t$ exceeds G, where $U_R^*/S$ is greater than $U_R/S$ and $S_{02}$ is less than $S_{01}$.

2. Braking system as in claim 1 wherein said auxiliary brake is also actuated when $\Delta U/\Delta t$ exceeds G.

3. Braking system as in claim 2 wherein the slope $U_R/S$ is a function of $\Delta U/\Delta t$.

4. Braking system as in claim 1 wherein said auxiliary brake is made ineffective when $\Delta U/\Delta t$ exceeds G.

5. Braking system as in claim 1 wherein $S_{01}$ is a function of $\Delta U/\Delta t$.

* * * * *